Feb. 6, 1940.    S. A. SNELL    2,189,232
VELOCIPEDE CONSTRUCTION
Filed Nov. 8, 1937
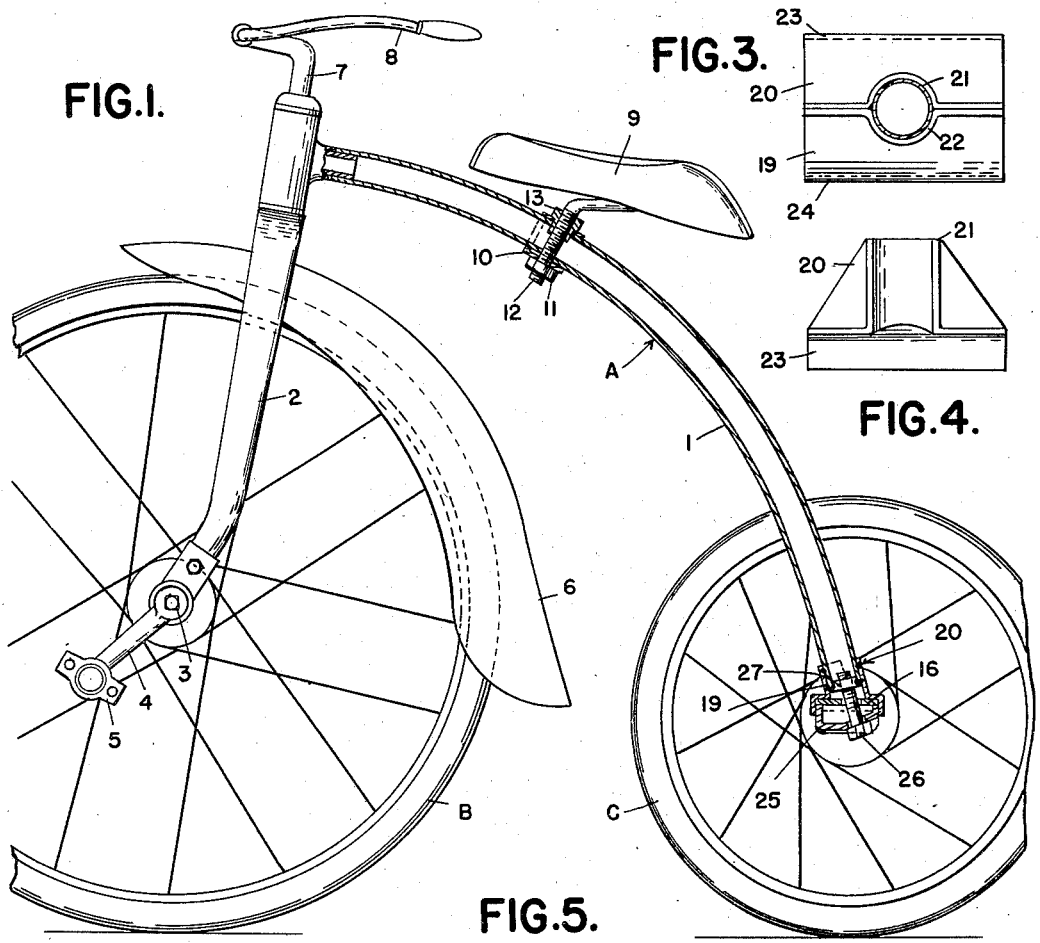
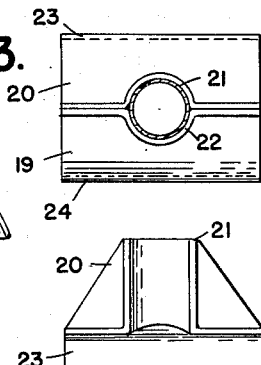
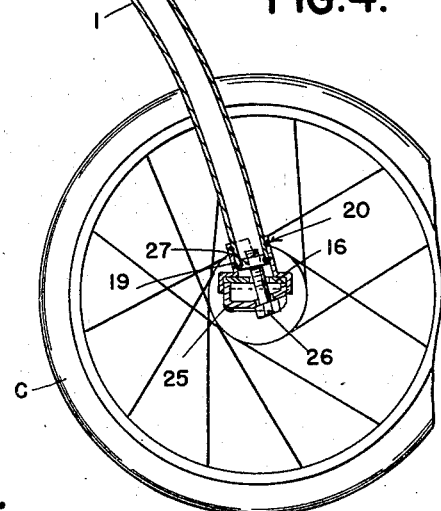
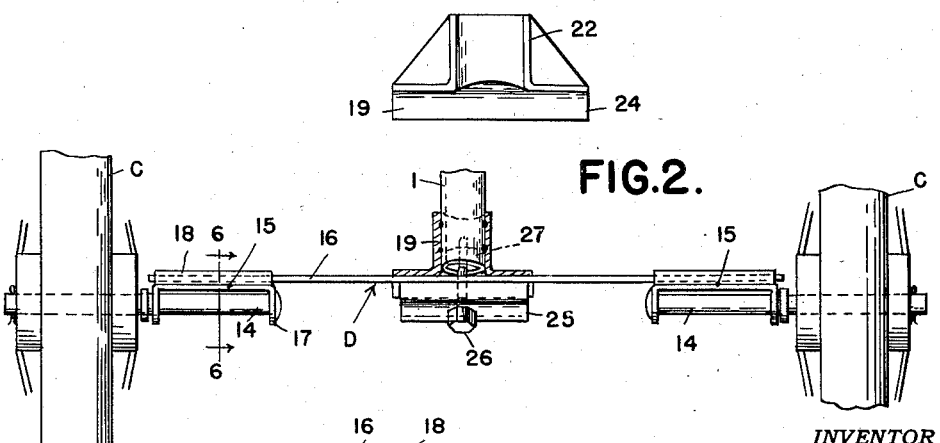
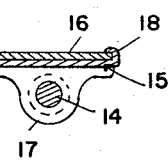
INVENTOR
SAMUEL A. SNELL
BY
ATTORNEYS Patented Feb. 6, 1940

2,189,232

UNITED STATES PATENT OFFICE 2,189,232

VELOCIPEDE CONSTRUCTION

Samuel A. Snell, Toledo, Ohio, assignor to The American-National Company, Toledo, Ohio, a corporation of Ohio Application November 8, 1937, Serial No. 173,495

14 Claims. (Cl. 301—125)

This invention relates generally to juvenile vehicles and refers more particularly to velocipedes.

One of the essential objects of the invention is to provide a velocipede wherein the rear axle has a flexible portion which materially improves the riding qualities and effectively cushions the rider from shocks and jars.

Another object is to provide an improved means for connecting the axle to the backbone of the velocipede.

Another object is to provide a relatively simple construction that can be manufactured at a comparatively low cost.

Other objects, advantages and novel details of construction of this invention will be made more apparent as this description proceeds, especially when considered in connection with the accompanying drawing wherein:

Figure 1 is a side elevation of a velocipede structure embodying my invention, with parts broken away and in section;

Figure 2 is a fragmentary rear elevation of the velocipede;

Figure 3 is a detail view of two of the stampings used to connect the rear axle to the backbone;

Figure 4 is a detail view of one of the stampings shown in Figure 3;

Figure 5 is a detail view of the other stamping shown in Figure 3;

Figure 6 is a sectional view taken on the line 6—6 of Figure 2.

Referring now to the drawing, A is the frame, B is the front wheel, and C are the rear wheels of a velocipede embodying my invention. As shown, the frame A comprises a non-flexible backbone 1 of tubular construction, a front fork 2 connected to said backbone at its forward end and straddling the front wheel B, and an axle D for the rear wheels C.

3 is an axle for the front wheel B journalled in the furcations of the front fork 2 and provided at opposite ends thereof with cranks 4 having pedals 5. As usual, the front fork 2 carries a suitable fender 6 and is connected at its upper end to the depending post 7 of a steering bar 8.

A seat 9 is adjustably mounted in a bracket 10 on the backbone 1 and is held in adjusted position by a nut 11. Preferably the supporting post 12 for the seat threadedly engages a bushing 13 carried by the bracket 10 and is engaged beneath the backbone 1 by the nut 11.

In the present instance the axle D for the rear wheels C comprises a pair of stub axles 14, brackets 15 on said stub axles at their inner ends, and an intermediate flat leaf spring 16 secured at opposite ends to said brackets 15. As shown, the wheels C are mounted on the stub axles 14, and the brackets 15 are preferably elongated stampings having downturned portions 17 at opposite ends thereof sleeved on the stub axles 14 and having upturned portions 18 at opposite longitudinal edges thereof embracing and secured to the flat spring 16. For securing the axle D to the backbone 1, I have provided a pair of cooperating stampings 19 and 20 having semi-circular portions 21 and 22, respectively, embracing and welded or brazed to said backbone 1 at its lower end and having cooperating depending elongated portions 23 and 24, respectively, straddling the flat spring 16. Another stamping 25 constituting a clamp engages the underside of the flat spring 16 between the depending portions 23 and 24 and is held in place by a bolt 26 threadedly engaging a plug or nut 27 within and welded or brazed to the backbone 1 at its lower end. Thus, with my construction the flat leaf spring 16 of the rear axles provides a flexibility simulating any action that is effective for cushioning the rider from road shocks and jars.

What I claim as my invention is:

1. In a velocipede, a backbone, a pair of supporting wheels for the backbone, an axle for the wheels having a flexible portion intermediate its ends, a connection between the flexible portion of said axle and said backbone including cooperating members fastened to said backbone and straddling the flexible portion of the axle, and a clamp fastened to said backbone and holding the flexible portion of the axle in fixed position relative to said members.

2. In a velocipede, a backbone, a pair of supporting wheels for the backbone, an axle for the wheels having a flexible portion intermediate its ends, a connection between the flexible portion of said axle and said backbone including a plurality of stampings, a plug, and a bolt, two of said stampings and said plug being fixed to said backbone, and another stamping cooperating with the two stampings aforesaid to grip the flexible portion of the axle and being actuable by said bolt.

3. In a velocipede, a strip of flexible material, a non-flexible backbone extending at substantially right angles to said strip, and a coupling between said strip and backbone including cooperating parts embracing the backbone and straddling said strip, and means carried by the backbone for holding the cooperating parts in engagement as aforesaid with said backbone and strip.

4. In a velocipede, a strip of flexible material, a non-flexible backbone extending at substantially right angles to said strip, and a coupling between said strip and backbone including cooperating parts secured to the backbone and straddling said strip, a clamping member engaging said cooperating parts, and actuating means for said clamping member carried by said backbone.

5. In a velocipede, a backbone, an axle disposed at substantially right angles to said backbone, and a connection between said parts including cooperating members having portions secured to the backbone and having portions straddling said axle, and means for holding the portions aforesaid in fixed relation to the axle including an element rigid with the backbone, and adjustable means carried by said element and cooperating with one of said portions.

6. In a velocipede, a backbone, an axle disposed at substantially right angles to said backbone, and a connection between said parts including cooperating members secured to the backbone and straddling the axle, a clamp upon the underside of the axle, an element fixed to the backbone, and an element engaging the clamp and adjustably engaging the fixed element aforesaid.

7. In a velocipede, a backbone, an axle disposed at substantially right angles to said backbone, and a connection between said parts including cooperating stampings secured to the backbone and straddling the axle, a clamp upon the underside of the axle, a plug fixed to the backbone, and a clamping bolt engaging the clamp and threadedly engaging the plug.

8. In a velocipede, a backbone, an axle disposed at substantially right angles to said backbone, means straddling the axle and secured to the backbone, and means holding the axle in position relative to said straddling means including clamping means on the underside of said axle and supported from said backbone.

9. In a velocipede, a backbone, an axle disposed at substantially right angles to said backbone, means straddling the axle and secured to the backbone, means holding the axle in position relative to said straddling means including a clamping member engaging the underside of said axle, and adjusting means for said clamping member carried by said backbone.

10. In a velocipede, a backbone, an axle disposed at substantially right angles to said backbone, and clamping means for said axle carried by the backbone, one part of said clamping means being suspended from and rigid with said backbone, and the other part of said clamping means being suspended from, but adjustable relative to said backbone.

11. In a velocipede, a backbone, an axle disposed at substantially right angles to said backbone, and a connection between said axle and backbone including two cooperating clamping means carried by said backbone and engaging said axle, one of said means being rigid with the backbone, and the other of said means being adjustably connected to said backbone.

12. In a velocipede, a backbone, an axle at the lower end of and disposed at substantially right angles to said backbone, and a connection between said parts including cooperating members rigidly secured to the backbone and having depending portions straddling said axle, and means for holding the axle in position relative to said members including clamping means on the underside of said axle between said depending portions and adjustably connected to said backbone.

13. In a velocipede, a tubular backbone, an axle disposed at substantially right angles to said backbone at the lower end thereof, and a connection between the backbone and axle including cooperating stampings having portions embracing and rigidly secured to the backbone and having depending portions straddling the axle, a clamping member on the underside of the axle between said depending portions, a plug anchored in the tubular backbone, and actuating means for the clamping member including a bolt extending through the clamping member and axle and threadedly engaging said plug.

14. In a velocipede, a tubular backbone, an axle disposed at substantially right angles to said backbone at the lower end thereof, and a connection between the backbone and axle including cooperating members having portions rigidly secured to opposite sides of the backbone and having depending portions straddling the axle, a clamping member on the underside of the axle, a plug anchored in the tubular backbone, and actuating means for the clamping member including a member readily engaging said plug.

SAMUEL A. SNELL.